J. McALEAR.
DIAPHRAGM EXHAUST VALVE FOR RADIATORS AND THE LIKE.
APPLICATION FILED OCT. 9, 1911.

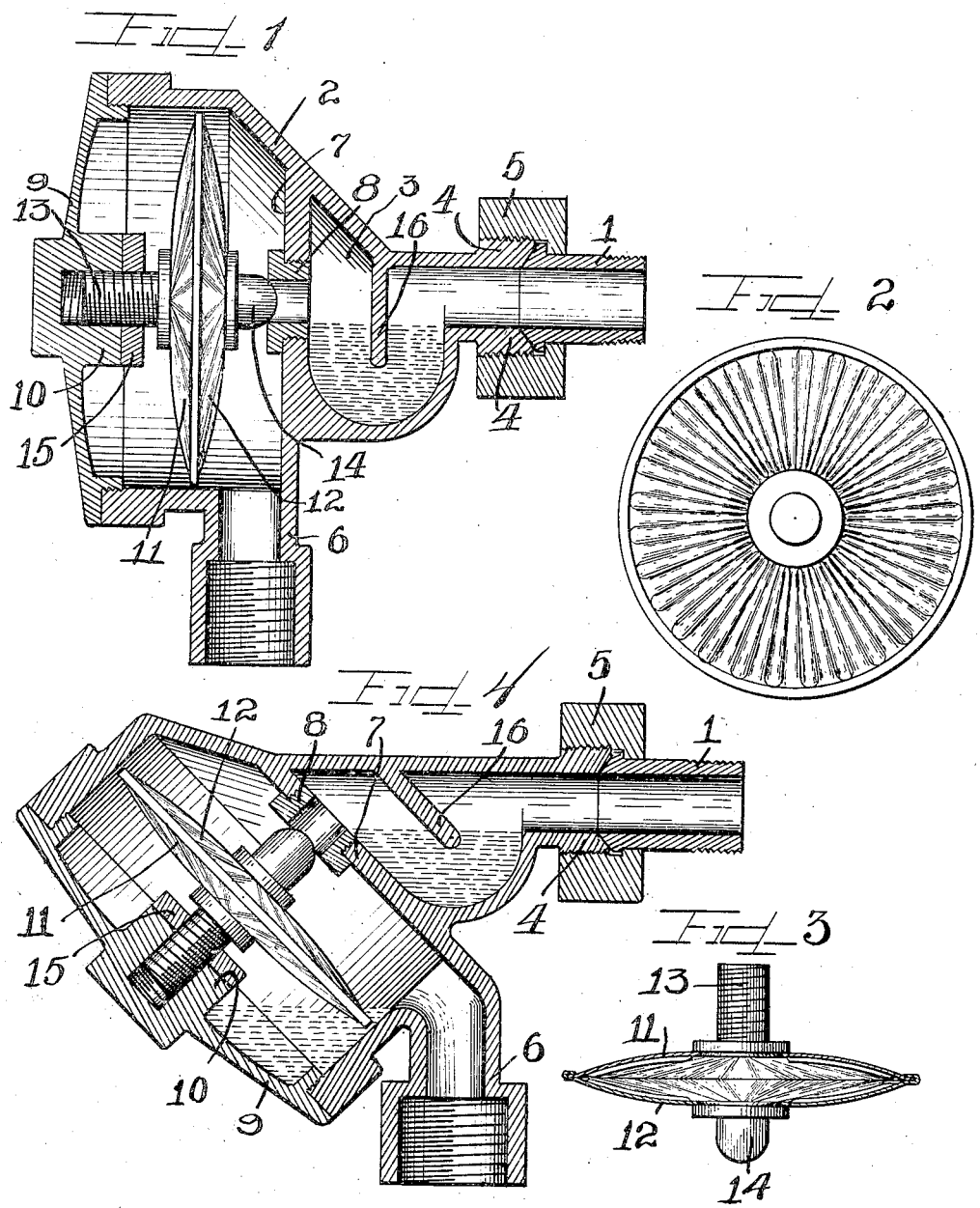

1,077,731.

Patented Nov. 4, 1913.

2 SHEETS—SHEET 2.

UNITED STATES PATENT OFFICE.

JAMES McALEAR, OF CHICAGO, ILLINOIS.

DIAPHRAGM EXHAUST-VALVE FOR RADIATORS AND THE LIKE.

1,077,731. Specification of Letters Patent. Patented Nov. 4, 1913.

Application filed October 9, 1911. Serial No. 653,523.

*To all whom it may concern:*

Be it known that I, JAMES MCALEAR, a citizen of the United States, and a resident of the city of Chicago, in the county of Cook and State of Illinois, have invented certain new and useful Improvements in Diaphragm Exhaust-Valves for Radiators and the like; and I do hereby declare that the following is a full, clear, and exact description of the same, reference being had to the accompanying drawings, and to the numbers of reference marked thereon, which form a part of this specification.

Steam radiators and many analogous devices are now equipped to exhaust the air (and to some extent, the water of condensation) from the radiator when the heat is turned on through an exhaust line connected with any suitable pump or exhaust mechanism for that purpose.

The object of this invention is to afford a thermally controlled valve controlling the connection between the exhaust line and the radiator, and whereby the temperature may be controlled in the room in which the radiator is installed by the operation of said valve.

It is also an object of the invention to afford a thermostatically controlled valve controlling the connection between the radiator and the exhaust line, and acting expansively to close the communication when the temperature is at normal and acting to open said communication when the temperature falls below that for which the thermostat is set, thereby permitting live steam to be drawn into the radiator.

It is also an important object of the invention to afford means for adjusting the thermostatic valve with reference to or from its seat to vary the closing thereof, as may be required, and to so construct the device as a whole that all operating parts thereof are inclosed and concealed from unauthorized interference.

It is also an object of the invention to afford a construction in which the thermostatic element controlling the valve is sealed from the heat of the radiator at all times except when the valve is open, by means of a non-conducting medium, which is removed upon the opening of the valve.

The invention is hereinafter more fully described and defined.

Figure 5:
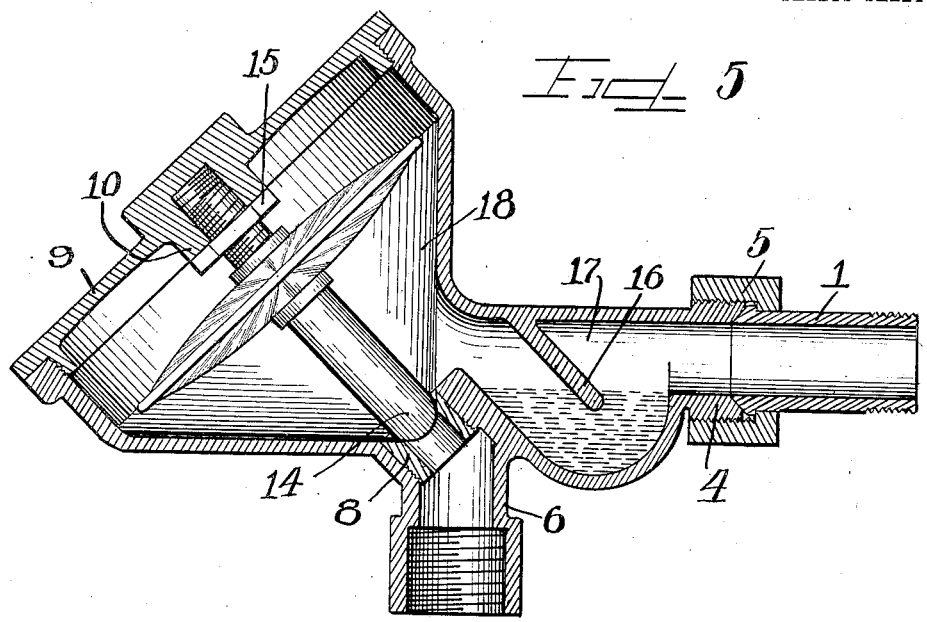
Figure 6:
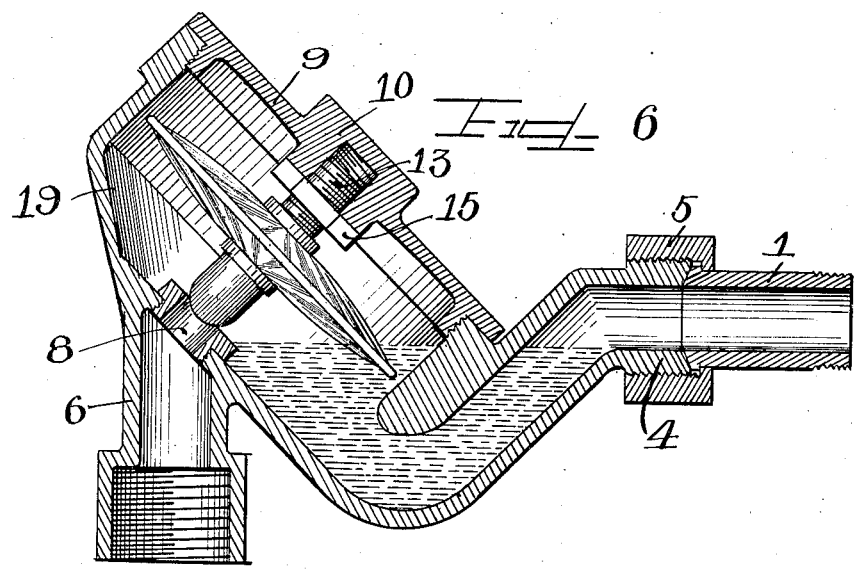

In the drawings: Figure 1 is a central, vertical section taken through a device embodying my invention, and showing the thermostatic valve in elevation. Fig. 2 is a face view of the thermostat and valve closure secured thereto. Fig. 3 is a central section of the thermostatic element, showing the closure and stem in elevation. Fig. 4 is a view similar to Fig. 1, but illustrating a slightly different form of the valve casing. Fig. 5 is a section similar to Fig. 1, but showing the valve controlling the communication to the exhaust pipe instead of to the radiator. Fig. 6 is a section similar to Fig. 5, illustrating a slightly different form of valve casing.

As shown in drawings: 1, indicates the union nipple connected in the radiator, as usual near the bottom thereof.

2, indicates the casing for the thermostat and valve, and 3, indicates a trap, which may be integrally (or otherwise) connected with the valve casing 2, to afford a water seal between the same and the radiator, and is provided with a threaded end 4, adapted to receive the union nut 5, thereon to rigidly engage the trap and casing upon the union nipple 1, in connecting the same to the radiator. Connected in the valve casing 2, on the lower side thereof, either integrally or otherwise, is a pipe coupling 6, adapted to afford connection of the exhaust or vacuum pipe in said valve casing.

As shown in Figs. 1 and 2, a wall or partition 7, is provided between the trap or water seal and the valve chamber, and an aperture is provided therethrough at substantially the axis of said valve chamber and above the normal level of the water in the water seal or trap, and a valve seat may be provided upon the wall surrounding said aperture or a removable valve seat 8, may be threaded into said aperture, as desired. A head 9, is threaded or otherwise tightly (but removably) secured to close said valve chamber, and as shown, a central, inwardly projecting boss 10, is provided on said head, which is provided with a threaded aperture therein in alinement with the valve seat. Secured in said valve chamber is a thermostat comprising a hollow diaphragm, preferably of sheet metal of high thermal conductivity, and, as shown, comprising two thin concave disks 11 and 12, of thin sheet metal, which are radially fluted to increase expansibility and flexibility, and as shown, are rigidly secured together at their peripheries in any suitable manner, as, for example, the edges of one being flanged over the other or in any manner connected therewith to afford a tight joint. Connected at the axis of the outer disk 11, of the diaphragm is a stem 13, threaded complementally with the aperture in said boss 10, in the head of the valve casing. Rigidly secured in alinement with said stem and upon the disk or plate 12, affording the other half of the diaphragm, is the valve closure 14, adapted to seat to close the communication between said trap and valve casing, as shown in Fig. 1. As shown, a jam nut 15, is provided on said stem for engagement against the face of the boss to rigidly hold the stem in its adjusted position independently of any vibration that may occur.

The valve casings may, of course, assume any desired or convenient form and may be arranged at any suitable angle with reference to the connection with the radiator. In the construction illustrated in Fig. 4, the valve casing is turned obliquely downward, thus slightly changing the shape of the trap or water seal, the wall 16 (affording the trap) being in Fig. 4, inclined to correspond with the inclination of the wall 7, between the trap and the valve casing. In this construction, some of the water of condensation from the radiator may remain in the valve casing, acting to retard the expansion of the diaphragm and consequent closing of the valve.

In the construction illustrated in Fig. 5, the trap or water seal 17, is afforded between the radiator and the valve casing 18. The discharge end of said trap, however, is at all times in open communication with said casing. The diaphragm is constructed as before described, or in any suitable manner, and the valve seat is provided between the valve casing and vacuum pipe, the casing being turned at a suitable angle for that purpose, so that said valve closes the vacuum line with the expansion of the diaphragm instead of the communication between the valve casing and trap.

Substantially the same arrangement is illustrated in Fig. 6, in which the valve casing 19, is inclined toward the radiator instead of from the same, as shown in Fig. 5, and the coupling 6, for the vacuum line is connected in the bottom of said valve chamber so that the water in the trap may rise substantially to the valve seat. In this construction, should there be a sufficient amount of water in the trap, the edge of the diaphragm dips thereinto, thus hastening the cooling of the diaphragm and consequent opening of the valve.

The operation is as follows: When the radiator is cold, the contraction of the diaphragm retracts the valve closure from its seat, so that the vacuum pipe is in open communication with the radiator, any water of condensation or air in the radiator, of course, having been drained or drawn out through the vacuum pipe. If now the inlet radiator valve be opened, the steam very quickly fills the entire radiator, the water of condensation falling to the bottom of the radiator and passing out as usual through the return pipe. When the radiator has become heated sufficiently for the hot steam to reach the diaphragm, the valve casing and diaphragm become heated. Expansion of the diaphragm promptly occurs, closing the valve, whether the valve closes the discharge to the trap or to the vacuum line. At this time there is practically no water of condensation in the trap or water seal, but as condensation occurs within the radiator constantly, a sufficient amount of water flows into the trap to afford the seal very shortly after the closing of the valve, thereby to a considerable extent reducing the conduction of heat to the walls of the valve casing, and in consequence the temperature of the walls of the valve casing and of the diaphragm within the casing soon falls. When the temperature of the diaphragm falls sufficiently, the valve closure is retracted from its seat and the operation is repeated—that is to say, the water in the trap is drawn therefrom through the vacuum pipe, steam is again drawn through the trap and casing, and the diaphragm again expands to close the valve.

From the construction described, it is evident that by adjusting the diaphragm from or toward the valve seat, by means of its threaded stem, a position therefor may be found at which the same will respond to open the valve at any variation of temperature below the point for which set. When so adjusted, the jam nut 15, serves to rigidly engage the same in adjusted position.

So far as the operation is concerned, in all essential particulars it is quite immaterial whether the valve act to close the communication between the trap and valve chamber, as shown in Figs. 1 and 4, or between the valve chamber and vacuum pipe. In either instance, the operation is the same, the water seal or trap serving as a non-conducting medium interposed between the thermostat or diaphragm controlling the valve and the heated radiator. The various angles of inclination of the casing permit the device to be installed conveniently under any and all conditions.

It is to be understood, of course, that I have described but the preferred form of my invention, although numerous details of construction may be varied. I therefore do not purpose limiting the patent to be granted on this application otherwise than necessitated by the prior art.

I claim as my invention:

1. A thermostatic valve comprising a casing, a partition therein affording a valve seat, a water sealed chamber afforded by said casing and partition, an inwardly lugged cover threaded on said casing, and a heat operated valve secured thereto and adapted to seat within said casing.

2. A thermostatic valve comprising a casing affording integral inlet and outlet passages, and a water seal chamber in said inlet passage, a diaphragm closure adapted to seat in one of said passages, and interior adjustment and locking means supporting the same.

3. A device of the class described embracing a casing, integral partitions therein affording a water seal chamber, a cover secured on said casing, an inwardly directed lug thereon, and a diaphragm valve secured therein and adapted to seat within said casing.

4. A device of the class described comprising a casing, a water seal chamber integral therewith, a water pocket afforded by said casing, and a thermostatic diaphragm secured in said casing and partially submerged.

5. A device of the class described comprising a casing, a water seal chamber integral therewith, and a thermostatic valve diaphragm secured in said casing and partially submerged in the water affording the seal.

6. In a device of the class described a thermostatically operated radiator exhaust valve, means thermally insulating said valve from the radiator when the valve is closed, means automatically displacing such thermal insulation when the valve is opened, and means on the interior of said device for adjusting the movement of said valve.

7. The combination with a radiator, of a thermostatic outlet exhaust valve connected therein, means affording a liquid seal between the valve and radiator at a point below the valve closure when the valve is closed, and a heat operated diaphragm submerged in said sealing liquid adapted to operate the valve closure.

8. The combination with a radiator and its thermostatic return line valve, of means affording a liquid insulating seal partially submerging said thermostatic means between the valve and radiator when the valve is closed.

9. The combination with a radiator and its thermostatically controlled return line valve, a casing for said valve, inlet and outlet connections on said casing normally maintaining the same in an inclined position, a water pocket afforded thereby partially submerging said thermostatic valve, and a water seal between said inlet and said valve in said casing.

In testimony whereof I have hereunto subscribed my name in the presence of two subscribing witnesses.

JAMES McALEAR.

Witnesses:
  LAWRENCE REIBSTEIN,
  CHARLES W. HILLS, Jr.